April 25, 1967  E. H. CARNEVALE ETAL  3,315,520
ULTRASONIC MEASUREMENT APPARATUS
Filed March 10, 1964

INVENTORS
EDMUND H. CARNEVALE
LAWRENCE C. LYNNWORTH
BY
Weingarten, Ossenbach & Pendiscio
ATTORNEYS

United States Patent Office 3,315,520
Patented Apr. 25, 1967

3,315,520
ULTRASONIC MEASUREMENT APPARATUS
Edmund H. Carnevale, Beverly, and Lawrence C. Lynnworth, Waltham, Mass., assignors to Parametrics, Inc., Waltham, Mass., a corporation of Massachusetts
Filed Mar. 10, 1964, Ser. No. 350,705
10 Claims. (Cl. 73—67.5)

This invention relates in general to ultrasonic measurements and more particularly to apparatus for determining the ultrasonic transmission characteristics of materials at elevated temperatures.

Non-destructive testing techniques have been found to be extremely useful both in analyzing materials for internal characteristics and for determining the characteristics of a processed material while the process is still going on. Various non-destructive testing techniques have been used to determine qualities such as the crystalline structure of a material, the grain size, internal voids and flaws in material and the like. These non-destructive techniques include X-ray diffraction methods, neutron radiography, optical and electrical techniques and ultrasonic measurements.

Ultrasonic measurements on a material can yield information on several qualities since the transmission of ultrasonic waves through material depends upon several factors. Among these factors are the temperature of the material, the grain size, the moduli of elasticity and the continuity of the material itself, that is the presence of voids or flaws. Accordingly, measurement of the transmission characteristics of longitudinal and shear ultrasonic waves through a material provides indications of these characteristics or qualities of the material. There are some characteristics which require measurement of the transmission characteristics of both shear and longitudinal waves. For example, one ultrasonic determination of Young's modulus of elasticity requires the measurement of both the longitudinal and shear wave velocities in order to obtain the ratio between the two.

In the past, various techniques have been employed in general for coupling both types of waves to the materials being tested. The techniques for measuring the transmission of shear waves have involved bonding the shear wave crystal to the material being tested or generating a longitudinal wave and utilizing mode conversion at one of the faces of the test material to generate shear waves in the specimen itself. The measurement of the longitudinal wave transmission characteristics of a material has generally been accomplished by coupling the transducer of longitudinal ultrasonic waves to the material to be tested by means of a suitable couplant. The most commonly used couplants have been water, glycerine, lubricating or silicone oils.

These techniques have not, however, been entirely satisfactory in making measurements on materials at high temperatures. Thus, glycerine, water and the other frequently used couplants for longitudinal waves are not entirely suitable for non-destructive testing under continuous operation at elevated temperature. Yet, determination of material characteristics at high temperature is becoming increasingly important. It is desirable to locate and evaluate defects and flaws at their earliest occurrence and in a high temperature process this means determining these characteristics at high temperatures so that the salvaging operation may increase in efficiency and a defective part does not have further work done upon it. In a similar manner problems arise in determining grain characteristics. Since grains are formed at high temperatures, it is apparent that if the measurements are performed at high temperatures then pieces containing irregular grain sizes can be reworked immediately. Additionally, the recognition of improper effects of processing while the process is going on allows the process parameters to be varied so that the material immediately following in the process will achieve the desired characteristics.

It is therefore the primary object of the present invention to provide apparatus for measuring at high temperature the transmission characteristics of ultrasonic waves in a material.

It is another object of the present invention to provide an apparatus for the measurement of both shear and longitudinal ultrasonic wave transmission in a material at high temperature.

It is yet another object of the present invention to provide an ultrasonic measuring apparatus particularly suited for high temperature measurements and including a probe for generating individually both shear and longitudinal waves.

Other objects and advantages will become apparent from the following description when taken in conjunction with the accompanying drawing in which.

Figure 1:
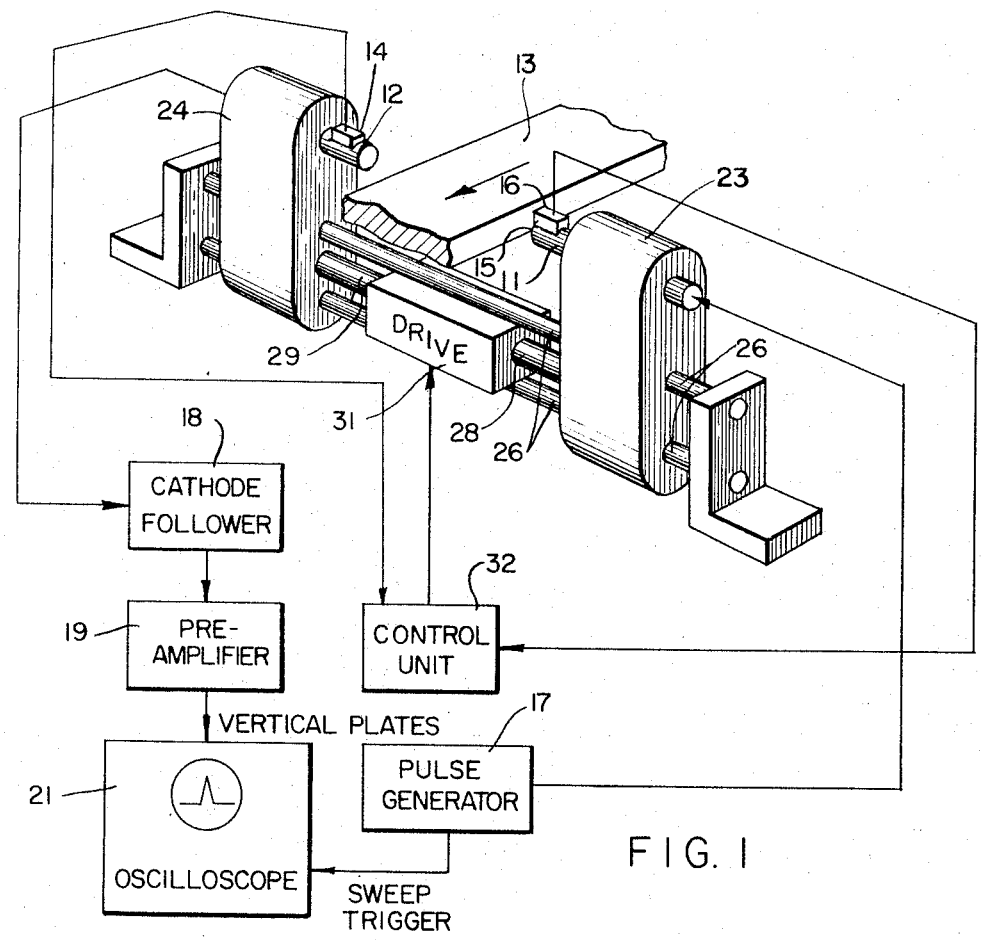
FIG. 1 is an illustration partly in perspective and partly in block diagrammatic form of a measuring apparatus constructed in accordance with the principles of this invention.

Referring now to FIG. 1, an apparatus is shown which is suitable for the measurement of ultrasonic wave transmission in a material to be tested at temperatures in excess of 1000° C. A transmitting ultrasonic probe 11 and a receiving ultrasonic probe 12 are mounted on opposite sides of a material to be tested 13. While the probes 11 and 12 may take several forms, one suitable form consists of an aluminum buffer rod approximately 1 inch in diameter to which has been bonded an ultrasonic wave generating crystal, such as a barium titanate crystal. In the transmitting probe 11 mounted near the transmitting face 15 of the probe is a thermal-sensing element 16 which provides a signal varying with the temperature at the face of the probe. Electrically connected to the transmitting probe 11 and more particularly to the crystal contained within the probe are pulses from pulse generator 17. These pulses which typically would be in the megacycle frequency range excite the crystal to produce the ultrasonic waves. The receiver probe 12 is constructed substantially the same as the transmitter probe 11, however, it may or may not have a thermal sensing element 14 and in this probe electrical pulses from the internal receiving crystal are connected to a cathode follower 18. The output from cathode follower 18 is coupled through a preamplifier 19 to an oscilloscope 21.

The ultrasonic transmission probe 11 is mounted in a sliding mount 23, which in turn is supported on a pair of bars 26 which extend parallel to the long axis of the transmission probe 11. Also mounted on bars 26 is a second carriage 24 which supports the receiving probe 12. The position of carriages 23 and 24 on the bars 26 is controlled by link members 28 and 29 respectively. The link members are in turn connected to a drive mechanism 31. The drive mechanism 31 operates the link members 28 and 29 either to drive the probes 11 and 12 away from each other and the material to be tested or, conversely, brings them together until they contact the sides of the material 13 in order that the transmission of ultrasonic waves from probe 11 to probe 12 may be measured. The drive mechanism 31 may take any of several completely conventional forms, for example, motor operated or hydraulically operated pistons. The drive mechanism 31 is operated by a control unit 32.

The method of operation of the above-described apparatus is as follows: in order to make a measurement at high temperature, the transmitting and receiving probes must be brought into only momentary contact with the material to be tested, such that any couplant, such as silicone grease on the faces of the probes is not excessively heated and so that the probes themselves are not heated beyond a suitable operating temperature, for example 100° C. During this momentary contact pulses of ultrasonic waves are transmitted from the transmitting probe 11 through the material to be tested 13 to the receiving probe 12. The time lapse between the generation of the wave at the face 15 of probe 11 and the arrival of this wave at the probe 12 is indicative of the velocity of the wave through the material 13. This velocity is, in turn, directly related to the temperature of the material. In addition, to the extent that acoustic coupling and electronic amplification remain reproducible, the amplitude of the wave received at the probe 12 is proportional to the continuity and grain structure of the material. The crystal within the receiving probe 12 converts the ultrasonic wave received into electrical pulses which, as previously pointed out, are coupled through a cathode follower 18 and preamplifier 19 to the vertical plate of the oscilloscope 21.

The pulse generator 17 provides, at the time when a pulse is generated to produce the ultrasonic wave in the transmitting probe 11, a pulse which triggers the sweep of oscilloscope 21. Thus, the time position along the horizontal ordinate of a pulse on the vertical plate is indicative of the velocity of the ultrasonic wave through the material and hence its temperature, while the amplitude of this pulse is indicative of the quality of the material being tested.

In order to control the time duration of the contact of the probes 12 and 11 with the material to be tested, the control unit 32 may be operated either on a temperature or on a time basis. In one arrangement the temperature sensing element 16 can provide a signal to the control unit 32 indicating the temperature at the face 15 of the transmitting probe 11 and this control unit 32 may operate to withdraw the probe when a preset temperature, for example, 100° C., is achieved at the probe face. The time of contact under usual conditions would be in the order of 1 millisecond and hence the control unit 32 may alternatively be operated to establish a 1 millisecond contact.

Figure 2:
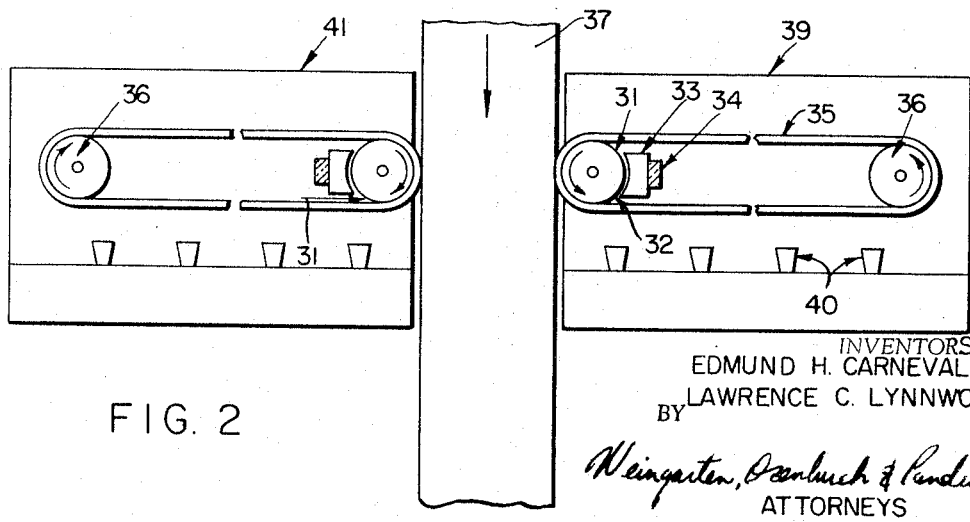
FIG. 2 is an illustration in block diagrammatic form of a preferred embodiment of an apparatus constructed in accordance with the principles of this invention.

Turning now to FIG. 2 a second embodiment of the measuring system for providing a momentary contact measurement of ultrasonic transmission is shown. In the embodiment shown in FIG. 2 the electrical apparatus for measuring the signals from the receiving transducer and for exciting the signals from the generating transducer are not shown. These are, however, completely conventional circuitry, similar to that shown in FIG. 1. In the apparatus of FIG. 2 the stock material 37 to be tested passes between a transmitter unit 41 and a receiver unit 39. The receiver unit 39 includes a pair of rollers 31 and 36 with the roller 31 serving as an acoustic idler which may be formed of fused silica. Stretched around the two idler rollers 31 and 36 is a belt 35 which serves to provide momentary acoustic contact between the stock material 37 and the acoustic idler roller 31. This belt 35 may typically be formed of a silicone rubber, since silicone rubbers have relatively good high temperature characteristics. A piezoelectric crystal 34 is cemented to a shoe 33. Shoe 33 is formed typically of nylon, and has a concave bearing surface adjacent the acoustic idler 31. At the interface between the acoustic idler 31 and the concave inner surface of the shoe 33 a suitable couplant 32, such as silicone grease is maintained to provide acoustical coupling between the shoe 33 and the idler 31. Since this couplant adheres somewhat to the idler 31, it also provides coupling between the idler 31 and the inside of the belt 35. The diameter of the idler 31 and the rotational speed of this idler 31 are arranged so that contact between a particular area of the belt 35 and the hot stock 37 is very brief, for example in the order of 1 millisecond. The length of the belt 35 is also arranged so that at the rotary speed of the idler 31 each portion of the belt material 35 is sufficiently cooled by cold air blowers 40 before it returns to contact with the stock.

While the transmitter unit 41 has the same physical arrangement as the receiver unit 39, it is electrically connected to generate ultrasonic waves from the piezoelectric crystal, whereas the receiver unit 39 generates an electrical signal when it receives the ultrasonic waves.

The two units, that is, the transmitter and receiver, can be positioned substantially opposite one another in this arrangement. If the velocity of the stock is 100 ft. per second and the stock is 12" wide, then the sound wave generated will be swept less than 1/10" downstream during its 63 microsecond transit time across the stock, assuming that the stock is 4340 steel at 2000° F., for which the velocity of the longitudinal ultrasonic wave equals 0.19 inch per microsecond.

Figure 3:
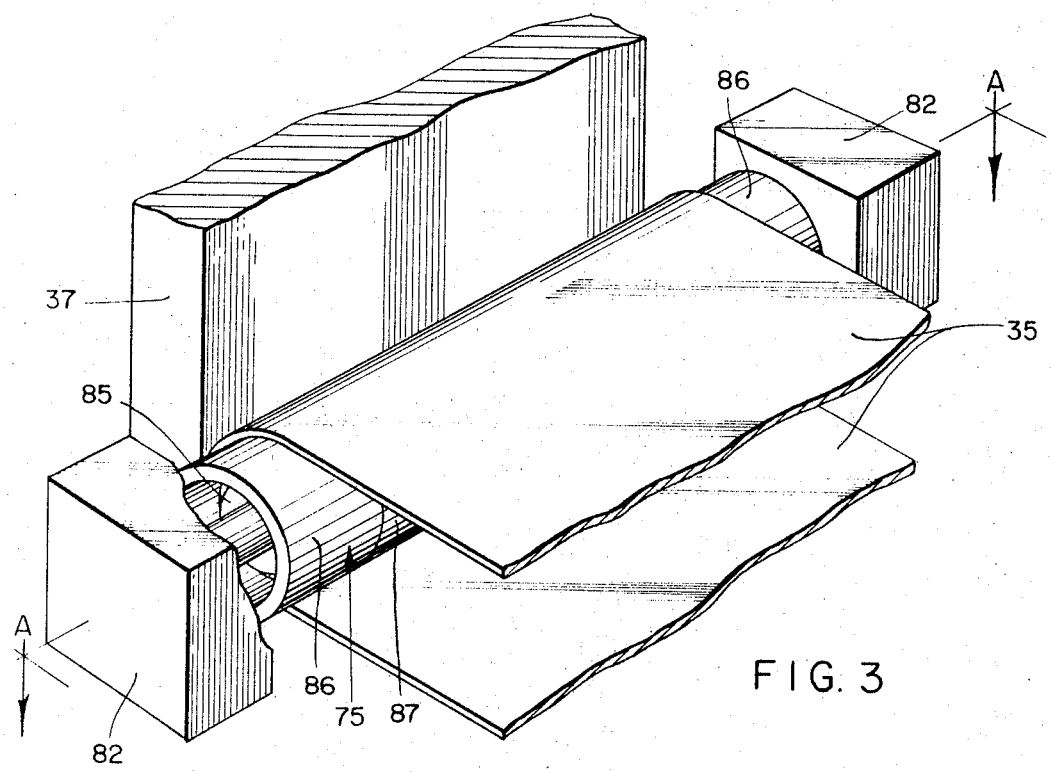
FIG. 3 is an illustration in perspective view of an alternative arrangement of a portion of the apparatus of FIG. 2.
Figure 4:
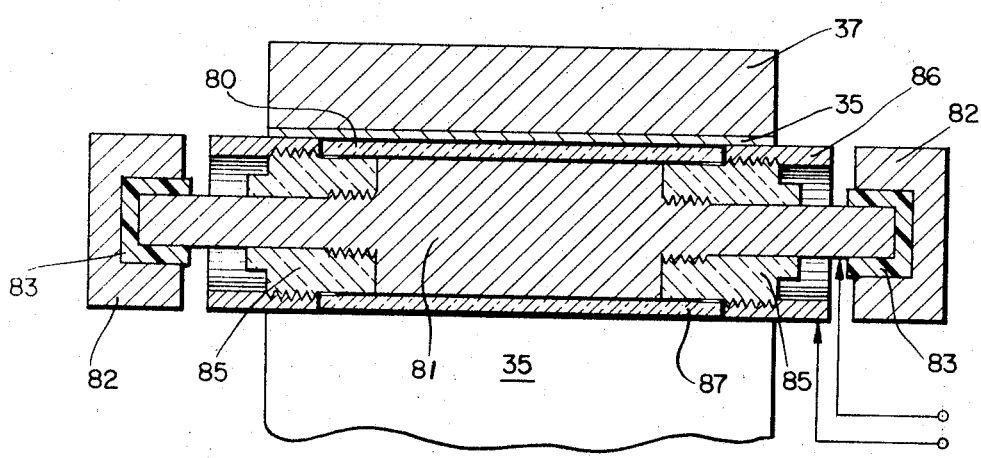
FIG. 4 is a cross-sectional view taken along the line A—A of FIG. 3.

In FIG. 2 the apparatus includes a piezoelectric crystal mounted on a shoe as the exciting source. In FIGS. 3 and 4 an alternative arrangement for the ultrasonic transmitter is illustrated. A tubular piezoelectric ceramic 75 is used in place of the acoustic idler 31 of FIG. 2. This tubular ceramic may be formed as a cylindrical shell of a material such as barium titanate or lead zirconate and would typically have a wall thickness of approximately 1/10". The ceramic is polarized to vibrate in the wall thickness mode, so that when energized it would transmit longitudinal ultrasonic waves through the high temperature material stock 37.

FIG. 4 is a cross-sectional view taken along the line A—A of FIG. 3 and illustrates in more detail the construction of the acoustical transmitting idler 75. A piece of tubular piezoelectric crystal 80 has its inside surface electroplated to within about 1/8" of either edge. This internal electro-plated surface is mounted on a central conductor 81. The central conductor 81 has a central portion of relatively larger diameter, approximately equal to the internal diameter of the cylindrical crystal and is then stepped down to a smaller diameter and therefore at either end has a reduced diameter portion extending out a pivot axle for the entire idler. Either end of the central conductor 81 is supported in a bearing block 82 within an electrically insulating insert 83. A portion of the central conductor 81 is threaded and has mounted on it at the threaded portion a second insulator 85, to which in turn is mounted an outer conductor 86. This latter outer conductor 86 is formed of an electrically conducting sleeve which is arranged to electrically contact the outer conductor surface 87 of the ceramic insulator. At one end of the idler electrical contacts are arranged to connect independently to the outer conductor 86 and the central conductor 81. Since this must be a rotating connection, the conventional techniques such as carbon brushes or mercury contacts should be employed.

The apparatus described above in conjunction with

FIGS. 2, 3, and 4 provides a system for momentary contact transmission measurements of longitudinal ultrasonic waves. It is not, however, suitable for measurements of shear ultrasonic waves. The conventional means for coupling shear waves to a specimen is to cement the transmitting probe face to the face of the specimen material. It is apparent that such a technique is not suitable for extremely high temperature operation. It has been found, however, that if the shear wave transmitting probe is pressed against the face of the specimen material with sufficient force, shear waves propagate into the specimen. Using this technique, shear waves may be coupled to specimen material at temperatures in excess of 1000° C. The pressures required are in the order of 100 to 10,000 lbs. per square inch.

Figure 5:
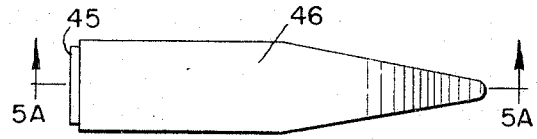
FIG. 5 is an illustration in perspective view of a probe element suitable for use in the apparatus illustrated in FIG. 1.
Figure 5A:
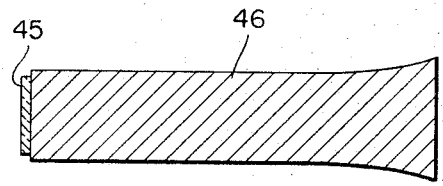
FIG. 5A is a cross-sectional view taken along the line A—A of FIG. 5.

Turning now to FIGS. 5 and 5A a configuration of probe is illustrated which is suitable for high temperature measurement in a generally reciprocating apparatus such as that shown in FIG. 1. In the probe of FIG. 5, a piezoelectric crystal 45 has been cemented to one end face of a steel probe element 46 which is roughly chisel-shaped, that is, it tapers at the end opposite the crystal to an edge having a radius of approximately ⅛". Using such a configuration, pressures in the order of 100 to 10,000 lbs. per square inch can readily be achieved, and not only longitudinal but also shear wave transmission to solid materials upon momentary contact, that is, contact in the order of 1 millisecond can be achieved. While in FIGS. 5 and 5A the chisel-shaped probe element has been illustrated, any configuration which provides for a maximum pressure on a small area is suitable. The size of the area is also affected by the requirement of a sufficiently large area of contact to generate a measurable signal at the receiving probe. A conically-shaped probe, or a hemispherical probe also readily provides sufficient pressure to enable shear wave coupling without any intermediate couplant.

As was briefly mentioned earlier one of the applications of ultrasonic wave transmission in a material is the determination of the modulus of elasticity of the material. In one such determination measurement of the velocity of both shear and longitudinal waves in the material must be made. The expression for Young's dynamic modulus of elasticity is given by:

$$E = \rho V_L^2 (1+\sigma)(1-2\sigma)/(1-\sigma)$$

where $\rho$ is the density of the material and Poisson's ratio is $$\sigma = \frac{1 - 2(V_T/V_L)^2}{2 - 2(V_T/V_L)^2}$$

where
$V_L$ = velocity of longitudinal waves, and
$V_T$ = velocity of shear wave.

Figure 6:
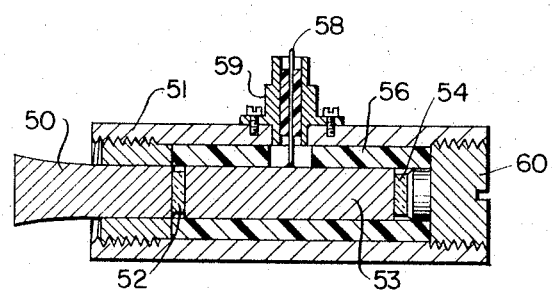
FIG. 6 is a vertical cross-sectional view of a probe element particularly suited for generating both shear and longitudinal ultrasonic waves in the apparatus of FIG. 1.

In order then to determine the modulus of elasticity the velocity of both shear and longitudinal waves must be measured in the specimen. Referring now to FIG. 6, there is shown a probe element suitable for applying both modes of ultrasonic waves in a momentary contact system, such as that illustrated in FIG. 1. In the probe of FIG. 6 a buffer contact rod 50 shown with a chisel edge has threaded to it a metal sleeve 51. At the opposite end of the rod element 50 from the chisel edge is mounted a piezoelectric crystal 52 adapted, when excited by appropriate electrical signals, to emit ultrasonic longitudinal waves. Fixed to the back face of crystal 52 is an electrically and acoustically conducting cylindrical rod element 53 which extends within the center section of sleeve 51 in axial alignment with the long axis of sleeve 51. At the opposite end of the cylindrical conductor 53 is cemented a second piezoelectric crystal 54 and this second crystal is specifically adapted to generate ultrasonic shear waves. A sleeve 56 formed of highly insulating material such as Teflon surrounds the cylindrical conducting element 53 with the exception of an opening which allows a conducting spring element 58 from a feedthrough connector 59 to contact the cylindrical conductor 53.

Mounted in the opposite end of the sleeve 51 from the chisel probe 50 is an electrically conducting retaining plug element 60 which threads within the sleeve in order to retain the series of elements including the two piezoelectric crystals 52 and 54 and the cylindrical conductor 53 in close juxtaposition. Additionally, since both end surfaces of both piezoelectric crystals 52 and 54 are conducting, then the chisel element 50, the sleeve 51, the retaining plug 60, and one surface of each of the piezoelectric crystals 52 and 54 are at a common electrical potential. The feedthrough connector 59 allows an electrical connection from spring 58 to be made through the conductor 53 to the other end surface of each of the crystals 52 and 54. With this probe element, when appropriate electrical energy is applied to spring 58, both the longitudinal emitting crystal 52 and the shear wave emitting crystal 54 are excited simultaneously. Since the shear waves travel through a given material at approximately one-half of the transmission rate of the longitudinal waves through the same material, then there will be a time difference of arrival of each of the generated waves at the chisel end, and hence at the test specimen. In a typical instance, the chisel element might be 2" long and the cylindrical conductor 53 also 2" long. In steel or aluminum at room temperature the longitudinal waves travel at approximately ¼" per microsecond, while the shear waves travel at ⅛" per microsecond, hence the longitudinal wave would appear at the chisel edge approximately eight microseconds after excitation, while the shear wave would not appear at the same point until thirty-two microseconds after excitation. Using this type of arrangement then the signals from a receiving probe (which need only contain a single piezoelectric crystal) can readily be ascribed to the proper mode of exciting ultrasonic energy.

The system may, however, be constructed in the opposite fashion, that is with the shear wave crystal cemented directly to the chisel-shaped contact element and with the longitudinal wave crystal mounted at the further end of the cylindrical conductor. Under these circumstances both the shear and longitudinal waves would arrive at the chisel edge at the same instant after excitation. Separation of these signals after transmission through the test specimen, could then be done on the basis of the difference in transmission time through the test specimen, since the longitudinal waves would travel at substantially twice the velocity of the shear waves through a given specimen.

Figure 7:
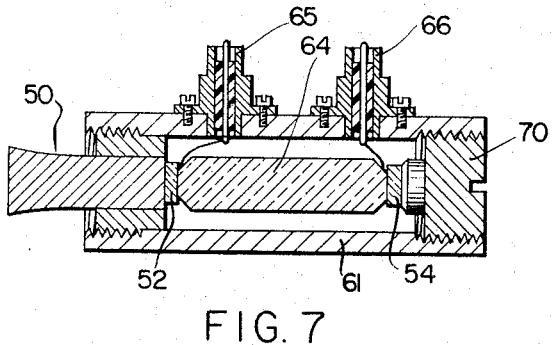
FIG. 7 is an illustration in vertical cross-sectional view of a second embodiment of a probe, suitable for use in the apparatus of FIG. 1 and which produces both longitudinal and shear ultrasonic waves.

In FIG. 7, a second embodiment of a contact probe providing for the application of both shear and longitudinal ultrasonic waves is shown. In the apparatus illustrated in FIG. 7, again a chisel-shaped contact element 50 is mounted in a metallic sleeve element 61 and a first piezoelectric crystal 52 again adapted to emit chiefly longitudinal ultrasonic waves and a second piezoelectric crystal 54 adapted chiefly to emit shear waves are mounted within the sleeve 61. However, in this instance, the crystals are cemented to opposite ends of a generally cylindrical insulating rod 64, which has slightly beveled edges at either end in order to permit for independent electrical connection to the respective crystals 52 and 54 by means of connecting wires from a pair of feedthrough connectors 65 and 66. Again in this instance a retaining plug 70 is mounted in the end of sleeve 61 in order to maintain the elements in close physical juxtaposition and also to provide an electrical contact from the outer face of crystal 54 through sleeve 61 to the chisel probe and the outer face of crystal 52. The cylindrical material 64 is, in this instance, an electrically insulating material which is suitable for the transmission of ultrasonic waves, for example, fused silica or acrylic resin. A probe of the type described and illustrated with reference to FIG. 7 can therefore be operated either to produce only shear waves, only longitudinal waves or both shear and longitudinal waves. Thus a pulse generator may be used which can switch the electrical signals to either one of the two input connections 65 and 66 or which can be programmed to alternately connect electrical energy to one and the other in a specific time sequence. Both of the probes illustrated in FIGS. 6 and 7 are suitable for the momentary contact operation at high temperatures. While in both FIGS. 6 and 7 the chisel-shaped contact element has been described, it will of course be understood that any suitably convenient element, capable of applying high pressure to the specimen material may be used.

The probe structures just described are suitable of course for operation in a device, such as that of FIG. 1, where the probes are moved linearly into contact with the test material, rather than in a rotational system such as that described with reference to FIGS. 2 and 3.

The invention having been described various modifications and improvements will now occur to those skilled in the art and the invention described should be construed as limited only by the spirit and scope of the appended claims.

What is claimed is:

1. Apparatus for measuring the ultrasonic transmission characteristics of a material at high temperature comprising, a transmitting probe for generating ultrasonic waves, a receiving probe for generating output electrical signals in response to received ultrasonic waves; circuit means coupled to said transmitting and said receiving probes for comparing said output electrical signals to said generated ultrasonic waves; positioning means for establishing physical contact between each of said probes and said material to be tested, control means connected to said positioning means, said control means operating said positioning means to establish simultaneous contact for a predetermined period between each of said probes and said material to be tested and to withdraw said probes from said contact after elapse of said predetermined period.

2. Apparatus in accordance with claim 1 wherein said predetermined period is less than one millisecond.

3. Apparatus for measuring ultrasonic transmission characteristics of a material at high temperature comprising, a transmitting probe for generating ultrasonic waves; a receiving probe for generating output electrical signals in response to received ultrasonic waves; circuit means coupled to said transmitting and said receiving probes for comparing said output electrical signals to said generated ultrasonic waves; a first temperature sensing element producing a signal indicative of variations in temperature, said first temperature sensing element being mounted on one of said probes; positioning means for establishing physical contact between each of said probes and said material to be tested, control means connected to said temperature sensing element and to said positioning means, said control means operating said positioning means to withdraw each of said probes from said physical contact when said temperature sensing element indicates a predetermined temperature.

4. Apparatus in accordance with claim 3 and including a second temperature sensing element mounted on the other one of said probes, said second temperature sensing element being connected to said control means, said control means operating said positioning means to withdraw both of said probes from said physical contact when the temperature of either one of said temperature sensing elements exceeds a predetermined level.

5. Apparatus for determining ultrasonic transmission characteristics of a material high temperature comprising, a transmitting probe for generating ultrasonic waves; a receiving probe for generating output electrical signals in response to received ultrasonic waves; circuit means coupled to said transmitting and receiving probes for comparing said output electrical signals to said generated ultrasonic waves; positioning means for establishing physical contact between each of said probes and said material to be tested, control means connected to said positioning means, said control means operating said positioning means to establish simultaneous contact for a predetermined period between each of said probes and said material to be tested and to withdraw said probes from said physical contact after elapse of said predetermined period, said positioning means including a mechanically reciprocating apparatus which provides for linear motion of each of said probes into and out of contact with said material.

6. Apparatus in accordance with claim 1 wherein said transmitting probes and said receiving probes each include contact elements of generally cylindrical form having an end portion for contacting said test material, the cross-sectional area of said end portion being small compared to the surface area at the opposite end of said cylinder.

7. Apparatus in accordance with claim 6 wherein said positioning means includes a reciprocating mechanism which provides that each of said probes advance into contact and withdraw from contact with said material in a linear path of motion.

8. Apparatus in accordance with claim 1 wherein said transmitting probe is arranged to emit in substantially the same direction from a single contacting surface of said probe both longitudinal and shear ultrasonic waves.

9. Apparatus in accordance with claim 5 wherein said transmitting probe is arranged to emit in substantially the same direction from a single contacting surface of said probe both shear and longitudinal ultrasonic waves.

10. Apparatus for measuring the ultrasonic transmission characteristics of a material at high temperature comprising:

a wave generator for generating ultrasonic waves;

a receiver for generating output electrical signals in response to received ultrasonic waves;

contact means for transmitting said generated ultrasonic waves to said test material and for transmitting ultrasonic waves from said material to said receiver;

positioning means for establishing physical contact between said contact means and said test material;

control means operating said positioning means to establish contact between said contact means and said test material for a period of time and to withdraw said contacting means from contact with said test material before the temperature of said contact means exceeds a predetermined level; and circuit means connected to said generator and said receiver for comparing said output electrical signals received during said period of contact to said ultrasonic waves generated from said generator during the same period of contact.

References Cited by the Examiner

UNITED STATES PATENTS 2,280,226 4/1942 Firestone _____ 73—67.8
3,074,267 1/1963 Martin _____ 73—67.5
3,147,169 9/1964 Albertson _____ 73—67.8

FOREIGN PATENTS 932,523 9/1955 Germany.
732,083 6/1955 Great Britain.
766,981 1/1957 Great Britain.

RICHARD C. QUEISSER, *Primary Examiner.*

J. P. BEAUCHAMP, *Assistant Examiner.*